US010833902B2

(12) United States Patent
Li et al.

(10) Patent No.: US 10,833,902 B2
(45) Date of Patent: Nov. 10, 2020

(54) MULTI-RADIO ACCESS TECHNOLOGY (MULTI-RAT) DIVERSITY FOR ULTRA-RELIABLE LOW-LATENCY COMMUNICATION (URLLC)

(71) Applicant: QUALCOMM Incorporated, San Diego, CA (US)

(72) Inventors: Chong Li, Weehawken, NJ (US); Jing Jiang, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 16/137,802

(22) Filed: Sep. 21, 2018

(65) Prior Publication Data

US 2020/0099560 A1 Mar. 26, 2020

(51) Int. Cl.
| | | |
|---|---|---|
| *H04L 27/26* | (2006.01) | |
| *H04B 17/364* | (2015.01) | |
| *H04W 28/06* | (2009.01) | |
| *H04W 72/04* | (2009.01) | |
| *H04W 88/06* | (2009.01) | |

(52) U.S. Cl.
CPC .......... *H04L 27/26* (2013.01); *H04B 17/364* (2015.01); *H04W 28/06* (2013.01); *H04W 72/0453* (2013.01); *H04W 88/06* (2013.01)

(58) Field of Classification Search
CPC ...... H04L 27/26; H04W 88/06; H04W 28/06; H04W 72/0453; H04B 17/364
See application file for complete search history.

(56) References Cited

U.S. PATENT DOCUMENTS

| | | | |
|---|---|---|---|
| 2011/0286408 | A1 | 11/2011 | Flore et al. |
| 2012/0140743 | A1* | 6/2012 | Pelletier ............ H04W 72/0453 370/335 |
| 2014/0308986 | A1 | 10/2014 | Yang et al. |
| 2017/0142592 | A1 | 5/2017 | Fischer et al. |
| 2017/0347271 | A1* | 11/2017 | Baldemair ............ H04W 16/14 |

OTHER PUBLICATIONS

International Search Report and Written Opinion—PCT/US2019/051791—ISA/EPO—Dec. 16, 2019.

* cited by examiner

*Primary Examiner* — Dady Chery
(74) *Attorney, Agent, or Firm* — Haynes and Boone, LLP

(57) ABSTRACT

Wireless communications systems and methods related to serving wireless communication devices using multi-radio access technology (multi-RAT) transmission diversity are provided. A first wireless communication device communicates, with a second wireless communication device in a first frequency band allocated to a first radio access technology (RAT), first data using the first RAT. The first wireless communication device reconfigures a first resource in a second frequency band allocated to a second RAT different from the first RAT from implementing a configuration of the second RAT to implementing a configuration of the first RAT. The first wireless communication device communicates, with the second wireless communication device in the second frequency band, second data using the first resource implementing the configuration of the first RAT.

30 Claims, 9 Drawing Sheets

MULTI-RADIO ACCESS TECHNOLOGY (MULTI-RAT) DIVERSITY FOR ULTRA-RELIABLE LOW-LATENCY COMMUNICATION (URLLC)

TECHNICAL FIELD

This application relates to wireless communication systems, and more particularly to serving wireless communication devices using multi-radio access technology (multi-RAT) transmission diversity. Certain embodiments can enable and provide solutions and techniques for improving communication performance (e.g., latency and/or reliability) by allowing a base station (BS) supporting multi-RAT to dynamically convert part of a frequency band allocated to a first RAT into a format of a second RAT and serve a user equipment (UE) of the second RAT using the converted portion of the frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

The NR technologies may be extended into new types of deployments to support new applications anchor new use cases. For example, NR may be designed to provide support for URLLC applications and/or services with stringent performance requirements. URLLC applications and/or services may have a low latency requirement (e.g., a latency of about 1 millisecond (ms) to about 10 ms) and a high reliability requirement (e.g., a block error rate of about 10e-5 to about 10e-9). In addition, URLLC traffic may be random and localized in time due to the low-latency requirement. Accordingly, improving URLLC performances can be challenging.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for a base station (BS) to serve a user equipment (UE) of a first RAT using multi-RAT transmission diversity. For example, the BS may schedule the UE for a first data communication on a first frequency band allocated to the first RAT. The BS may communicate the first data with the UE on the first frequency band using the first RAT. The BS may switch to schedule the UE for a second data communication on a second frequency band allocated to a second RAT based on a retransmission metric and/or a latency bound associated with the first data and/or the second data. The BS may dynamically reconfigure a resource in the second frequency band based on a configuration or format of the first RAT. The BS may communicate the second data with the UE on the second frequency band using the reconfigured resource and the first RAT.

For example, in an aspect of the disclosure, a method of wireless communication includes communicating, by a first wireless communication device with a second wireless communication device in a first frequency band allocated to a first radio access technology (RAT), first data using the first RAT. The method includes reconfiguring, by the first wireless communication device, a first resource in a second frequency band allocated to a second RAT different from the first RAT from implementing a configuration of the second RAT to implementing a configuration of the first RAT. The method includes communicating, by the first wireless communication device with the second wireless communication device in the second frequency band, second data using the first resource implementing the configuration of the first RAT.

In an additional aspect of the disclosure, an apparatus includes a first antenna of a first radio access technology (RAT), a transceiver, and a processor. The transceiver is configured to communicate, via the first antenna with a first wireless communication device in a first frequency band allocated to the first RAT, first data using the first RAT. The processor is configured to reconfigure a first resource in a second frequency band allocated to a second. RAT different from the first RAT from implementing a configuration of the second RAT to implementing a configuration of the first RAT. The transceiver is further configured to communicate, via the first antenna with the first wireless communication device in the second frequency band, second data using the first resource implementing the configuration of the first RAT.

In an additional aspect of the disclosure, a computer-readable medium having program code recorded thereon, the program code including code for causing a first wireless communication device to communicate, with a second wireless communication device in a first frequency band allocated to a first radio access technology (RAT), first data using the first RAT. The computer-readable medium includes code for causing the first wireless communication device to reconfigure a first resource in a second frequency band allocated to a second RAT different from the first RAT from implementing a configuration of the second RAT to implementing a configuration of the first RAT. The computer-readable medium includes code for causing the first wireless communication device to communicate, with the second wireless communication device in the second frequency band, second data using the first resource implementing the configuration of the first RAT.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
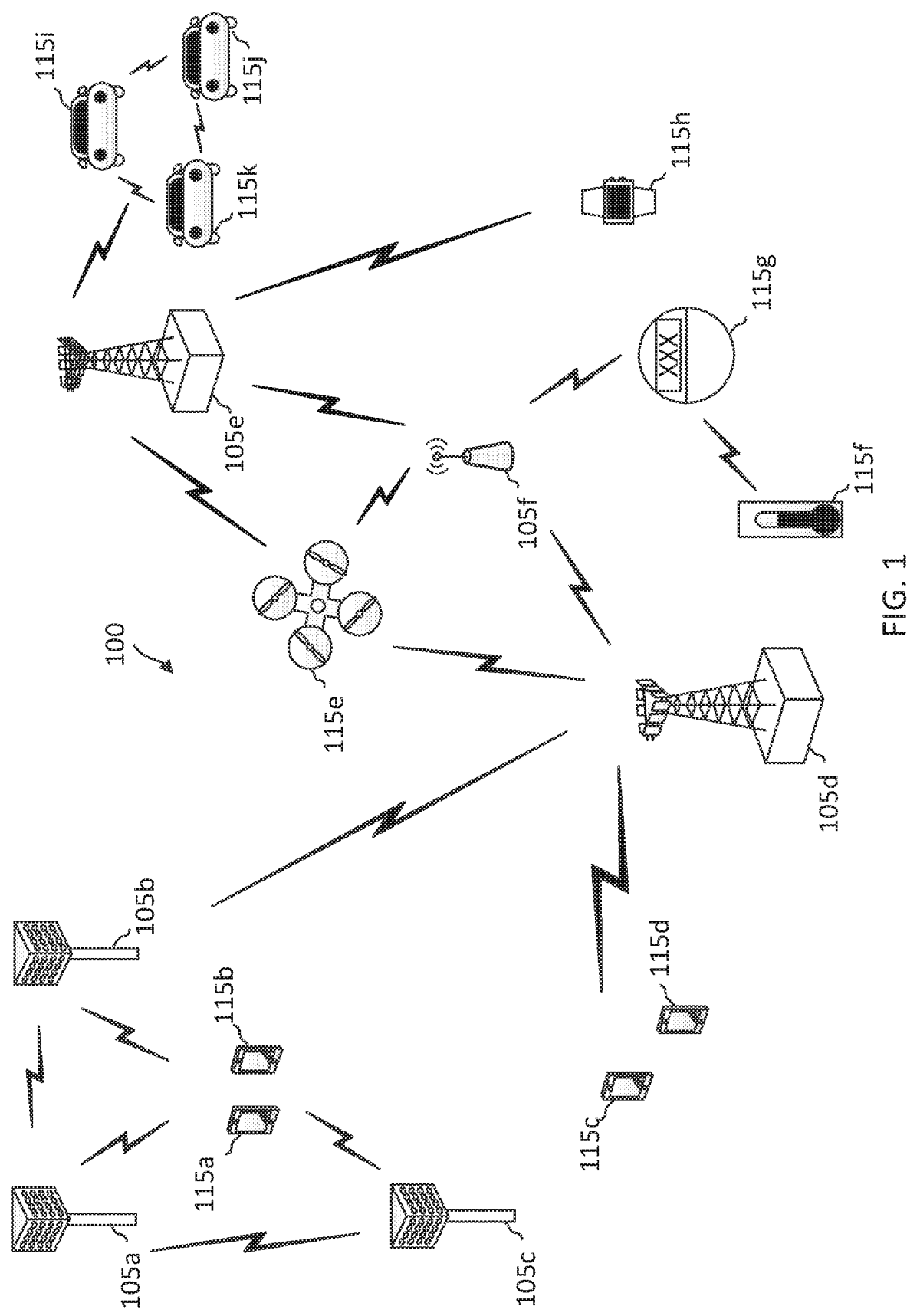
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for improving communication latency and/or reliability performance by utilizing multi-RAT transmission diversity. For example, a BS may support multi-RAT serving UEs of a first RAT (e.g., NR) and UEs of a second RAT (e.g., LTE). The BS may configure a UE of the first RAT to operate in a carrier aggregation mode with a first frequency band allocated to the first RAT and a second frequency band allocated to the second RAT. The BS may configure the first frequency band and the second frequency band as a primary component carrier (PCC) and a secondary component carrier (SCC), respectively, for communicating with the UE. Under normal operating conditions, the BS schedules data communications with the UE using the first frequency band (e.g., the PCC). The data may be communicated using hybrid automatic repeat request (HARQ) to provide high-reliability. The BS may monitor retransmission statistics and latency bounds for the data communications, traffic loads in the first frequency band and the second frequency band, and/or channel conditions or channel qualities of the first frequency band and the second frequency band. The BS may switch to schedule a next transmission and/or a retransmission for the data communications to the second frequency band (e.g., the SCC) based on the monitoring.

In an embodiment, the resources in the first frequency band and the second frequency band may be configured with different numerologies and/or different link directions based on corresponding RATs. In some instances, the UE may support the first RAT, but may not support the second RAT. For example, the UE may be a standalone NR UE, and thus may not support LTE. Thus, the BS may reconfigure resources in the second frequency band according to the first RAT so that the UE can use the first RAT to communicate with the BS in the second frequency band.

In an embodiment, the BS may dynamically convert or format resources in the second frequency band to switch between the first RAT and the second RAT based on traffic load and/or channel conditions of the first frequency band and the second frequency band to serve the UEs of the first RAT and the UEs of the second RAT.

Aspects of the present disclosure can provide several benefits. For example, the use of the second frequency band of the second RAT for transmission diversity can improve communication performance. The reconfiguration or reformatting of the resources of the second RAT to conform to the first RAT allows the UE to continue to use resources of the second RAT based on the first RAT without having to support the second RAT. Thus, standalone UEs or UEs supporting a single RAT may benefit from multi-RAT transmission diversity. While the disclosed embodiments are described in the context of serving URLLC services to NR UEs using NR frequency bands and LTE frequency bands, the disclosed embodiments can be applied to serve any types of data using any suitable RATs. In addition, the disclosed embodiments can be used in conjunction with other types of transmission diversities, such as time, frequency, and/or spatial (e.g., multi-path) diversities.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. In general, a BS 105 may be referred to as an eNB in LTE and may be referred to as a gNB for NR. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internee of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may support multiple RATs. For example, the network 100 may operate over a first frequency band allocated for communications using LTE and a second frequency band allocated for communication using NR. In the network 100, a BS 105 may function as a eNB for LTE and as a gNB for NR. The BS 105 may serve LTE services to a standalone LTE UE 115 on the LTE frequency band. Similarly, the BS 105 may serve NR services to a standalone NR UE 115 on the NR frequency band. According to the embodiments of the present disclosure, a BS 105 may determine to serve a certain NR service (e.g., a URLLC service) to a UE 115 using both the LTE frequency band and the NR frequency band to benefit from multi-RAT transmission diversity. The BS 105 may dynamically configure a portion of the resources in the LTE frequency band to switch from a configuration (e.g., a numerology and/or a link direction) of LTE to a configuration (e.g., a numerology and/or a link direction) of the NR. Thus, the BS 105 may serve the NR service to the UE 115 using NR technology without having the UE 115 to support both NR and LTE. Some example applications requiring URLLC services may include industrial automation, self-driving cars, drones, robots, power grid systems, alarm systems, and/or any applications requiring time-critical remote interactions. Mechanisms for provisioning URLLC services with multi-RAT transmission diversity are described in greater detail herein.

Figure 2:
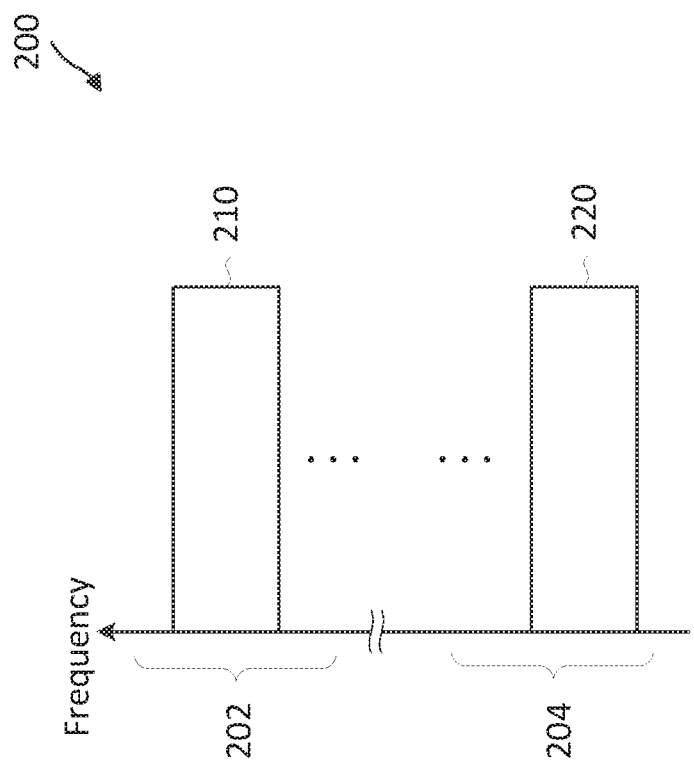
FIG. 2 illustrates a frequency band configuration according to some embodiments of the present disclosure.

FIG. 2 illustrates a frequency band configuration according to embodiments of the present disclosure. In FIG. 2, the x-axis represents time in some arbitrary units, and the y-axis represents frequency in some arbitrary units. The configuration 200 may be employed by BSs such as the BSs 105 and UEs such as the UEs 115 in a network such as the network 100. The configuration 200 includes an NR carrier or NR frequency band 210 in a frequency range 202 and an LTE carrier or LTE frequency band 220 in a frequency range 204. The LTE frequency band 220 may be located at a lower frequency than the NR frequency band 210. For example, the frequency range 204 may be between about 700 megahertz (MHz) to about 3 GHz and the frequency range 202 may be in the sub-6 GHz or mmWave frequency range. While FIG. 2 illustrates one LTE frequency band 220 and one NR frequency band 210 for purposes of simplicity of discussion, it will be recognized that embodiments of the present disclosure may scale to many more LTE frequency bands 220 in the frequency range 204 (e.g., about 2, 3, 4 or more) and/or many more NR frequency bands 210 in the frequency range 202 (e.g., about 2, 3, 4 or more).

The NR frequency band 210 may be used by an NR network for NR communications. The LTE frequency band 220 may be uses by an LTE network for LTE communications. Frequency resources in the NR frequency band 210 are configured based on an NR numerology, while frequency resources in the LTE frequency band 220 are configured based on an LTE numerology. A numerology may include parameters that define a waveform transmission. Some example numerology parameters may include a subcarrier spacing, a cyclic prefix (CP) length, the length of an OFDM symbol, an FFT size, the number of symbols in a subframe or transmission time interval (TTI), and/or the duration of the subframe or the TTI.

For example, an LTE network typically supports a 15 kilohertz (kHz) subcarrier spacing across all transmission frequencies, with a subframe duration of about 1 millisecond (ms) or about 14 OFDM symbols and a scheduling granularity of about 0.5 ms (e.g., a slot duration). On the other hand, an NR network allows for a flexible numerology. For example, NR allows for a subcarrier spacing that may scale from about 15 kHz to about 480 kHz depending on the frequency band of operation. As the subcarrier spacing increases, the symbol duration decreases. NR may use a fixed CP overhead or a fixed CP duration as the subcarrier spacing increases depending on the deployment and/or operational environment. In addition, NR provides scheduling flexibility, where scheduling may be at a finer granularity than a subframe or a slot. NR may use a variable-length mini-slot that is shorter than a subframe or slot for scheduling. For example, a subframe of a particular numerology may include about 14 symbols, but a transmission schedule may span any number of symbols between about 1 to about 14 within the subframe. In general, different RATs, (e.g., NR and LTE) may utilize different protocols and/or signaling for communications and may support different features.

In some embodiments, the NR frequency band 210 and/or the LTE frequency band 220 may be configured for TDD communications. In other words, UL and/or DL communications may occur over the same frequency band at different times. In some instances, the link directions in the NR frequency band 210 and the link direction in the LTE frequency band 220 may be synchronized. In other words, the NR frequency band 210 and the LTE frequency band may switch the link direction from a UL direction to a DL direction or from a DL direction to a UL direction at the same time. In other instances, the link directions in the NR frequency band 210 and the link direction in the LTE frequency band 220 may not be aligned. In other words, the NR frequency band 210 may be configured for UL communications during a certain time period, while the LTE frequency band 220 may be configured for DL communications during the same time period.

As described above, a BS may support both LTE and NR, functioning as an NR gNB when serving an NR UE or functioning as an LTE eNB when serving an LTE UE. The LTE frequency band 220 and the NR frequency band 210 may have different traffic patterns or loads and/or channel conditions.

The present disclosure provides techniques for provisioning wireless communication services using multi-RAT transmission diversity, where a BS serving a service (e.g., a URLLC service) to an NR UE on an NR frequency band may dynamically switch to use a portion of an LTE frequency band to serve part of the service, for example, based on a latency requirement and/or a retransmission failure metric. Accordingly, the present disclosure may increase transmission diversity, and thus improving communication performances.

Figure 3:
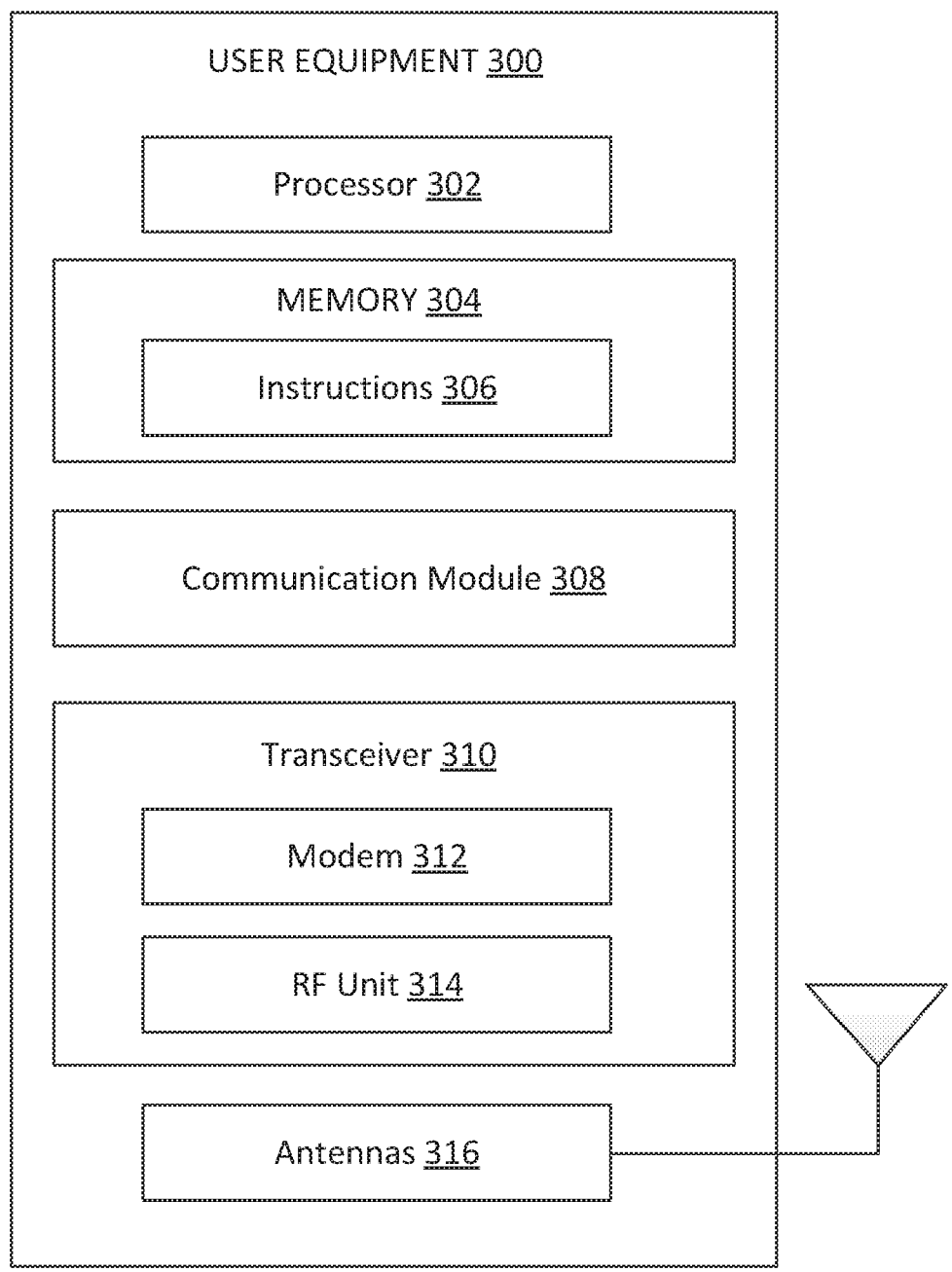
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 as discussed above. As shown, the UE 300 may include a processor 302, a memory 304, a communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 308 may be implemented via hardware, software, or combinations thereof. For example, the communication module 308 may be implemented as a processor, circuit, and/or instructions 306 stored in the memory 304 and executed by the processor 302. The communication module 308 may be used for various aspects of the present disclosure. For example, the communication module 308 is configured to receive a configuration from a BS (e.g., the BSs 105) for communicating data using carrier aggregation based on a first RAT (e.g., NR), receive a first transmission grant for a first frequency band (e.g., the NR frequency band 210) of the first RAT from the BS, communicate first data with the BS on the first frequency band using the first RAT (e.g., NR numerologies) based on the first transmission grant, receive a second transmission grant for a second frequency band (e.g., the LTE frequency band 220) of a second RAT (e.g., LTE) from the BS, and/or communicate second data with the BS on the second frequency band using the first RAT based on the second transmission grant.

In an embodiment, the first data transmission may be an initial transmission of a data packet. The second data transmission may be a retransmission of the data packet. The switching of the second data transmission to the second frequency band may be based on a number of remaining retransmission opportunities allowed for the data packet, a latency requirement for the data packet, traffic loads on the first frequency band and the second frequency band, and/or channel conditions on the first frequency band and the second frequency band.

In an embodiment, the first data transmission and the second data transmission may carry different data information bits. The switching of the second data transmission to the second frequency band may be based on a latency requirement of the second data, a traffic load in the first frequency band, and/or a traffic load in the second frequency band. Mechanisms for communicating data with multi-RAT transmission diversity are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
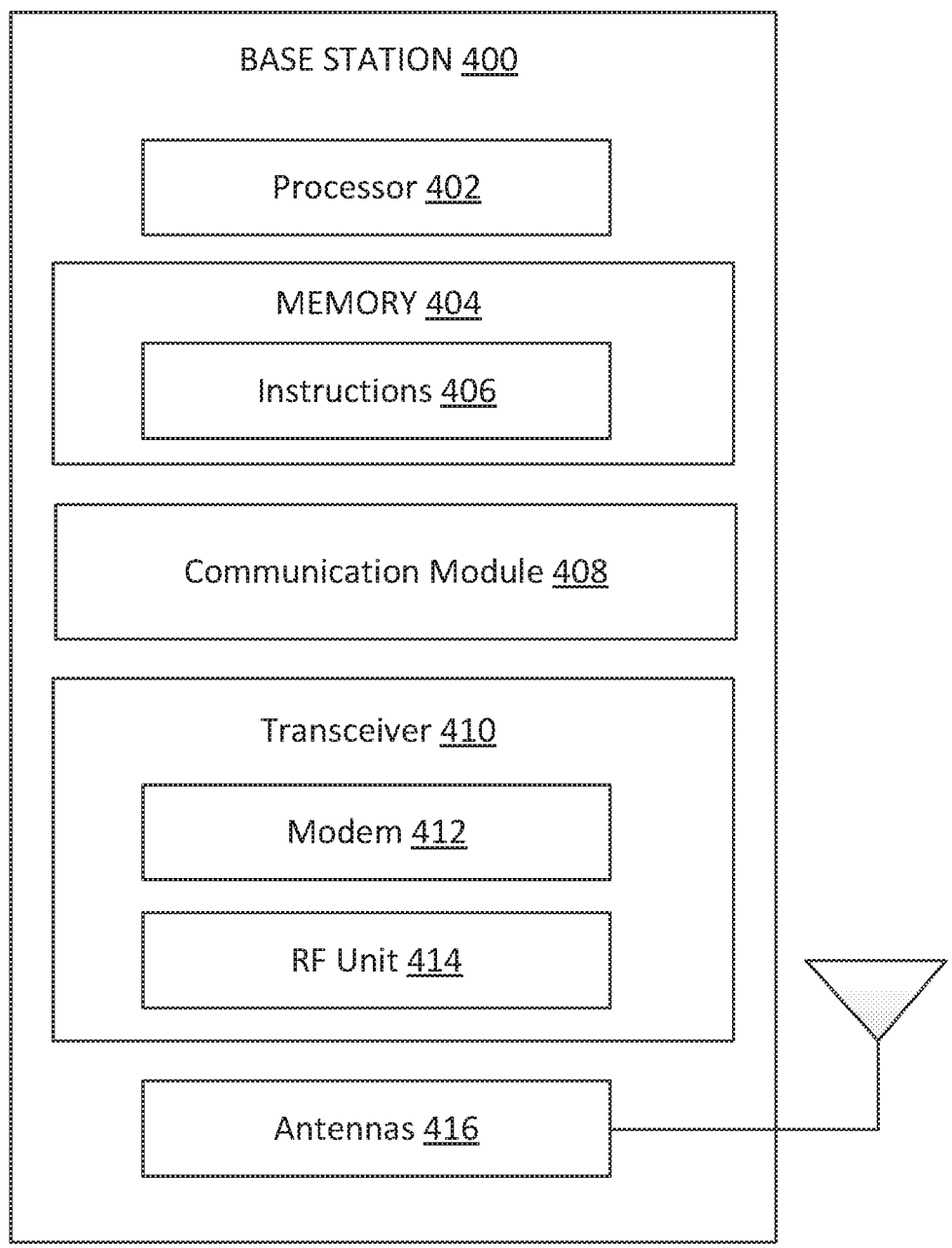
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105 as discussed above. A shown, the BS 400 may include a processor 402, a memory 404, a communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 3.

The communication module 408 may be implemented via hardware, software, or combinations thereof. For example, the communication module 408 may be implemented as a processor, circuit, and/or instructions 406 stored in the memory 404 and executed by the processor 402. The communication module 408 may be used for various aspects of the present disclosure. For example, the communication module 408 is configured to transmit a configuration to a UE (e.g., the UEs 115 and 300) of a first RAT (e.g., NR) for communicating data using carrier aggregation using the first RAT, transmit a first transmission grant for a first frequency band (e.g., the NR frequency band 210) of the first RAT from the BS, communicate first data with the UE on the first frequency band using the first RAT (e.g., NR numerologies) based on the first transmission grant, transmit a second transmission grant for a second frequency band (e.g., the LTE frequency band 220) of a second. RAT (e.g., LTE) to the UE, reconfigure resources in the second frequency band for use by the first RAT, and/or communicate second data with the UE on the second frequency band using the first RAT based on the second transmission grant.

In an embodiment, the first data transmission may be an initial transmission of a data packet. The second data transmission may be a retransmission of the data packet. The communication module 408 is further configured to switch to the schedule for the second data from the first frequency band to the second frequency band based on a number of remaining retransmission opportunities allowed for the data packet, traffic loads on the first frequency band and the second frequency band, and/or channel conditions on the first frequency band and the second frequency band.

In an embodiment, the first data transmission and the second data transmission may carry different data information bits. The communication module 408 is further configured to switch the schedule for the second data from the first frequency band to the second frequency band based on a latency requirement of the second data, traffic loads on the first frequency band and the second frequency band, and/or channel conditions on the first frequency band and the second frequency band.

In an embodiment, the communication module 408 is further configured to communicate with UEs of the second RAT in the second frequency band using the second RAT. The communication module 408 is further configured to dynamically switch resources in the second frequency band from a configuration of the second RAT to a configuration of the first RAT when communicating with a UE of the first RAT using the resources. The communication module 408 is further configured to revert the resources into the configuration of the second RAT after completing the communications with UE of the first RAT and use the resources to communicate with a UE of the second RAT. Mechanisms for communicating data with multi-RAT transmission diversity are described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

In some embodiments, the BS 400 may support multiple RATs serving UEs (e.g., the UEs 115) of different RATs (e.g., NR and LTE). In such embodiments, the BS 400 may include multiple transceivers 410 and multiple antennas 416 supporting the multiple RATs. For example, each transceiver 410 may communicate with one of the antennas 416 to serve a certain RAT, Alternatively, at least some portions of the transceiver 410s and/or antennas 416 may be shared among the different RATs.

Figure 5:
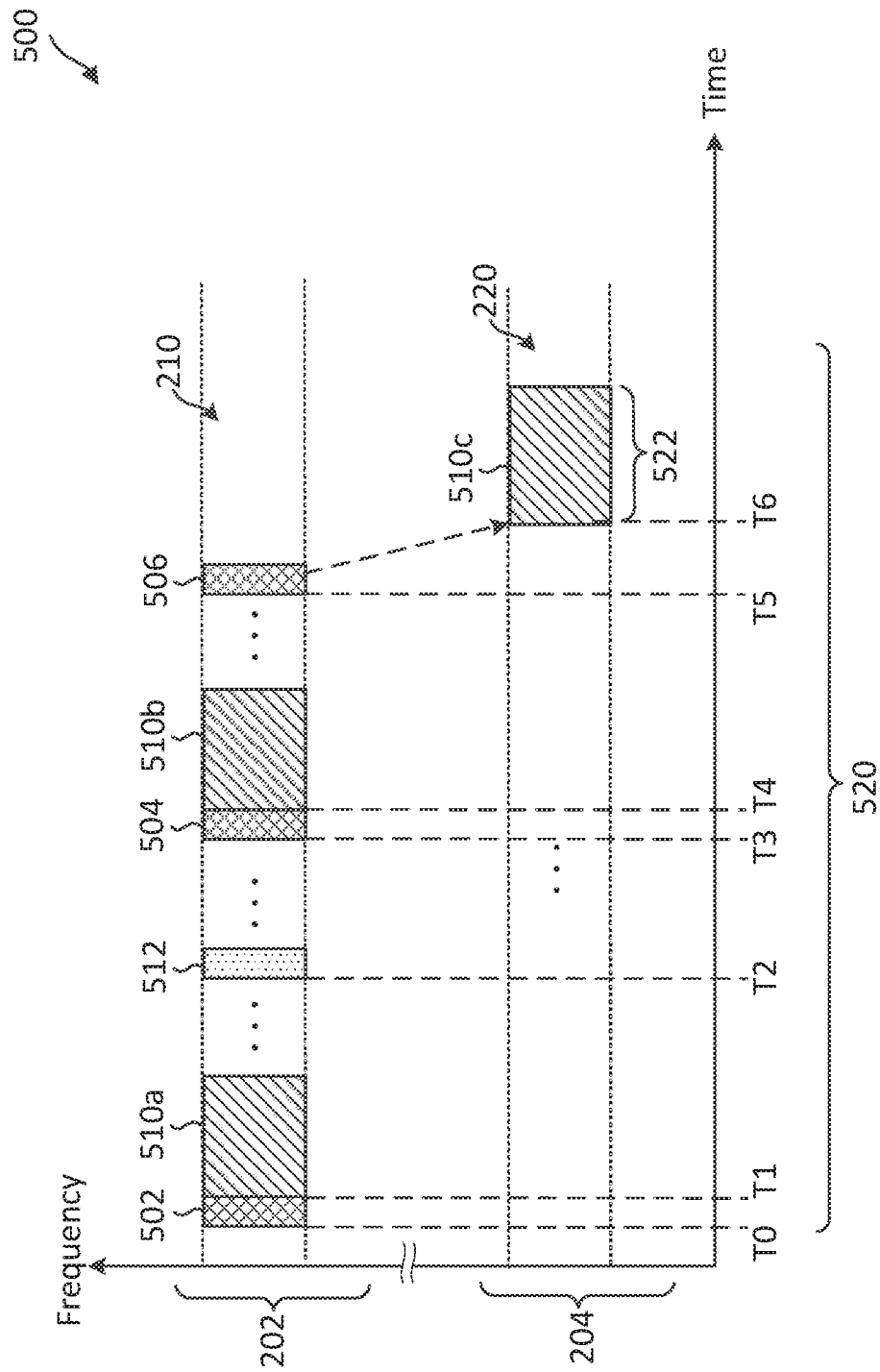
FIG. 5 illustrates a communication method with multi-radio access technology (multi-RAT) transmission diversity according to some embodiments of the present disclosure.

FIG. 5 illustrates a communication method 500 with multi-RAT transmission diversity according to some embodiments of the present disclosure. In FIG. 5, the x-axis represents time in some arbitrary units, and the y-axis represents frequency in some arbitrary units. The method 500 may be employed by BSs such as the BSs 105 and UEs such as the UEs 115 in a network such as the network 100. The method 500 is described using the frequency configuration 200. In the method 500, a BS may utilize multi-RAT transmission diversity to serve an NR URLLC service to a standalone NR UE on the NR frequency band 210 and the LTE frequency band 220. The standalone NR UE refers to a UE that implements NR protocol alone without support for LTE. The BS may be capable of serving NR UEs and LTE UEs. In other words, the BS may function as an NR gNB implementing NR protocols and formats, as well as an LTE eNB implementing LTE protocols and formats.

For example, at time T0, the BS transmits a transmission grant 502 to the UE in the NR frequency band 210. The transmission grant 502 indicates a schedule for transmitting a URLLC data 510 in the NR frequency band 210. At time T1, the UE transmits the URLLC data 510 (shown as 510a) to the BS in the NR frequency band based on the transmission grant 502. The URLLC data 510a may correspond to a first coded version of the URLLC data 510 as described in greater detail below. The URLLC data 510 may be communicated using a HARQ protocol to provide the high reliability required by the URLLC data 510a. HARQ may use a combination of forward error correction (FEC) coding and ARQ retransmission control.

In a HARQ process, a transmitting node may receive a data packet (e.g., the URLLC data 510) in the form of a transport block (TB) from a higher network layer. The transmitting node may encode the data packet based on an FEC code (e.g., an LDPC code). The transmitting node may transmit a first coded version of the data packet (e.g., the URLLC data 510a) to a receiving node. The receiving node may report the reception status for the data packet to the transmitting node. For example, the receiving node may transmit an acknowledgement (ACK) to the transmitting node when the data packet is received successfully without any error. Alternatively, the receiving node may transmit a not-ACK (NACK) to the transmitting node when the data packet is received unsuccessfully (e.g., with errors). Upon receiving a NACK, the transmitting node may retransmit the data packet, for example, by transmitting a second coded version of the data packet. The second coded version may be the same as the first coded version or different from the first coded version. The receiving node may combine the received first coded version and the received second coded version for error correction when both the received first coded version and the received second coded version are erroneous.

As an example, the BS receives the URLLC data 510a with an error. Thus, at time T2, the BS transmits a NACK 512 in the NR frequency band 210. At time T3, the BS transmits a transmission grant 504 to the UE in the NR frequency band 210. The transmission grant 504 indicates a schedule for a retransmission of the URLLC data 510 in the NR frequency band 210. At time T4, the UE retransmits the URLLC data 510 (e.g., shown as URLLC data 510b) to the BS in the NR frequency band 210 based on the transmission grant 504. The URLLC data 510b may correspond to a second coded version of the URLLC data 510. The second coded version may be the same as the first coded version or different from the first coded version. The BS may again fail to receive the URLLC data 510b correctly or may miss the detection of the URLLC data 510b. Thus, the BS may determine to switch to the LTE frequency band 220 for another retransmission of the URLLC data 510.

At time T5, the BS transmits a transmission grant 506 to the UE in the NR frequency band 210. The transmission grant 506 indicates a schedule for a retransmission of the URLLC data 510 in the LTE frequency band 220 instead of the NR frequency band 210. The BS may determine to switch to the LTE frequency band 220 based on various factors. For example, the BS may determine that the number of retransmissions allowable for the URLLC data 510 may exceed a certain threshold (e.g., with one remaining retransmission allowed before the URLLC data 510 is dropped). Alternatively, the BS may determine that a latency bound 520 for the URLLC data 510 is about to expire.

At time T6, the UE retransmits the URLLC data 510 (e.g., shown as URLLC data 510c) to the BS in the LTE frequency band 220 based on the transmission grant 506. The URLLC data 510c may correspond to a third coded version of the URLLC data 510. The third coded version may be the same as the second coded version or different from the second coded version.

The UE transmits all three URLLC data 510a, 510b, and 510c using NR technologies, protocols, and/or formats. In order to allow the UE to transmit the URLLC data 510c using NR On the LTE frequency band 220, the BS may reconfigure resources in the LTE frequency band 220 according to NR technologies, protocols, and/or formats.

In one example, the NR frequency band 210 may be configured to use a different numerology (e.g., a different subcarrier spacing, CP length, and/or symbol length) than the LTE frequency band 220. Thus, the BS may reconfigure resources in the LTE frequency band 220 using the NR numerology and including a schedule of the NR numerology in the transmission grant 506. The BS may refrain from allocating the corresponding resources to any LTE UE.

In another example, the NR frequency band 210 and the LTE frequency band 220 may be configured for TDD operations. However, the NR frequency band 210 and the LTE frequency band 220 may not be aligned in terms of link directions. Thus, the BS may reconfigure resources in the LTE frequency band 220 to switch from one link direction to another link direction. As an example, the LTE frequency band 220 is configured for DL communications during a time period 522 in which the URLLC data 510c is scheduled. Thus, the BS may reconfigure the frequency band 220 to switch from the DL direction to the UL direction to allow the UE to transmit the URLLC data 510c during the time period 522 in a UL direction over the LTE frequency band 220. Similarly, the BS may refrain from scheduling any LTE UE in the LTE frequency band 220 during the time period 522.

In some embodiments, the BS may reconfigure (e.g., re-farm) a portion of the LTE frequency band 220 for NR use. For example, the frequency band 220 may span from about 1 MHz to about 10 MHz. The BS may configure frequency resources (e.g., RBs) between about 1 MHz to about 5 MHz for LTE communications and frequency resources between about 5 MHz to about 10 MHz for NR communications. In such embodiments, the BS may schedule the URLLC data 510c on resources in the portion of the LTE frequency band 220 that is allocated for NR.

While the method 500 is described in the context of UL URLLC data transmissions, similar scheduling mechanisms may be applied to DL URLLC data transmissions. In other words, a BS may serve a DL URLLC data packets using the NR frequency band 210 and the LTE frequency band 220.

As can be seen in the method 500, the BS can switch URLLC data communications from the NR frequency band 210 to the LTE frequency band 220 when the NR frequency band 210 may not meet certain requirements of the URLLC data communications. The reformatting or reconfiguring of resources in the LTE frequency band 220 allows the URLLC data to be communicated using NR alone without requiring a UE to support both NR and LTE. Accordingly, the present disclosure can provide improved URLLC performance to NR UEs benefiting from the multi-RAT transmission diversity.

Figure 6:
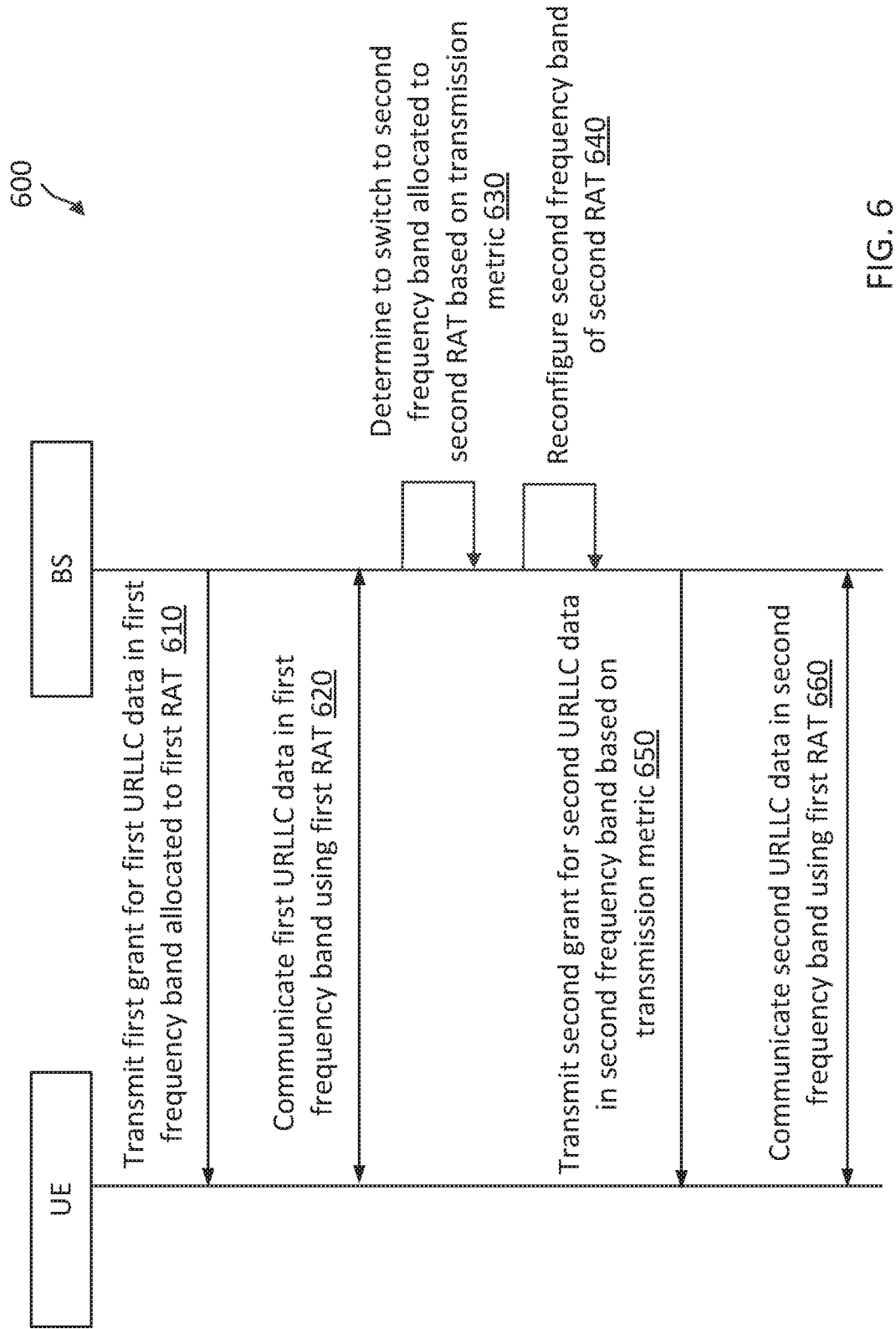
FIG. 6 is a signaling diagram illustrating a communication method with multi-RAT transmission diversity according to some embodiments of the present disclosure.

FIG. 6 is a signaling diagram illustrating a communication method 600 that utilizes multi-RAT transmission diversity according to some embodiments of the present disclosure. The method 600 is implemented by a BS (e.g., the BSs 105 and 400) and a UE(e.g., the UEs 115 and 300). The method 600 may use similar mechanisms as in the method 500 described above with respect to FIG. 5. Steps of the method 600 can be executed by computing devices (e.g., a processor, processing circuit, and/or other suitable component) of the BS and the UE. The BS may function as a BS in a network of the first RAT (e.g., NR) and may function as a BS for a second network of the second RAT (e.g., LTE). The UE may be a UE in the first network of the first RAT. As illustrated, the method 600 includes a number of enumerated steps, but embodiments of the method 600 may include additional steps before, after, and in between the enumerated steps. In some embodiments, one or more of the enumerated steps may be omitted or performed in a different order.

In the method 600, the BS serves a URLLC service to the UE over a first frequency band (e.g., the NR frequency band 210) allocated to the first RAT and a second frequency band (e.g., the LTE frequency band 220) allocated to the second RAT. The BS may configure the UE to operate in a carrier aggregation mode with the first frequency band as a PCC and the second frequency band as an SCC.

At step 610, the BS transmits a first transmission grant (e.g., the transmission grants 502 and 504) for first URLLC data (e.g., the URLLC data 510a and 510b) of the URLLC service in the first frequency band of the first RAT. The first transmission grant indicates a first resource allocated in the first frequency band.

At step 620, the BS communicates the first URLLC data with the UE in the first frequency band using the first RAT. The first URLLC data may be communicated using the first resource based on a configured NR numerology.

At step 630, the BS determines to switch to the second frequency band of the second RAT for a next transmission schedule based on a transmission metric associated with a latency bound (e.g., the latency bound 520) and/or a maximum allowable number of retransmission opportunities for the URLLC service.

In an embodiment, the next transmission schedule is for a retransmission of the first URLLC data. The BS may determine the number of times the first URLLC data have been retransmitted. The BS may compare the number of retransmissions to a threshold. The threshold may be set according to the maximum allowable number retransmission opportunities for the first URLLC data. For example, when the number of remaining transmission is one before the first URLLC data is dropped, the BS may determine to switch the next retransmission to the second frequency band. The BS may alternatively or additionally determine that the latency bound for the first URLLC data is about to expire, and thus may determine to switch to the second frequency band. In some embodiments, the BS may utilize the first frequency band for initial transmission (e.g., the URLLC data 510a) and utilize the second frequency band for retransmissions e.g. the URLLC data 510b and 510c).

In an embodiment, the next transmission schedule is for second URLLC data different from the first URLLC data. The BS may determine the switch based on a latency requirement for the second URLLC data, traffic loads of the first frequency band and the second frequency band, and/or channel qualities of the first frequency band and second frequency band.

At step 640, the BS reconfigures a second resource in the second frequency band based on the first RAT. The BS may convert the second resource from a numerology of the second RAT to a numerology of the first RAT. The BS may switch a link direction of the second resource to allow for the retransmission of the first URLLC data.

At step 650, the BS transmits a second transmission grant (e.g., the transmission grant 506) for the second URLLC data (e.g., the URLLC data 510c) in the second frequency band based on the transmission metric. The BS may transmit the second transmission grant in the first frequency band using cross-carrier scheduling. The second transmission grant indicates the second resource in the second frequency band.

At step 660, the BS communicates the second URLLC data with the UE in the second frequency band using the first RAT. The second URLLC data may be communicated using the second resource based on the same NR numerology as the first URLLC data. When the second URLLC data is a retransmission, the second URLLC data carries the same data information as the first URLLC data. When the second URLLC data is a new transmission, the second URLLC data carries different data information than the first URLLC data.

In one embodiment, the first URLLC data and the second URLLC data are DL URLLC data transmitted from the BS to the UE. In another embodiment, the first URLLC data and the second URLLC data are UL URLLC data transmitted from the UE to the BS.

Figure 7:
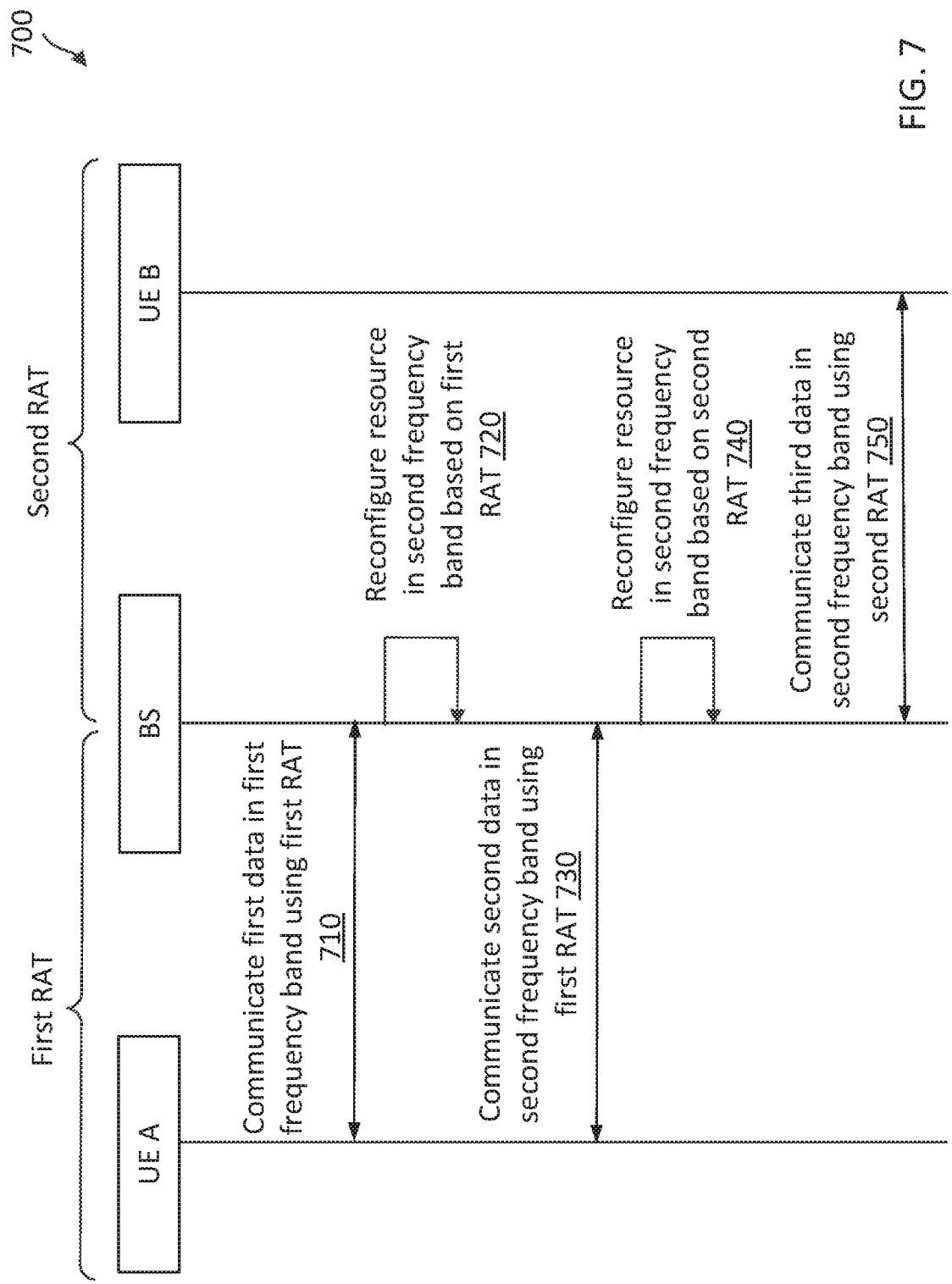
FIG. 7 is a signaling diagram illustrating a communication method with multi-RAT transmission diversity according to some embodiments of the present disclosure.

FIG. 7 is a signaling diagram illustrating a communication method 700 that utilizes multi-RAT transmission diversity according to some embodiments of the present disclosure. The method 700 is implemented by a BS (e.g., the BSs 105 and 400) and a UE A and a UE B (e.g., the UEs 115 and 300). The method 700 may use similar mechanisms as in the methods 500 and 600 described above with respect to FIGS. 5 and 6, respectively. The BS may function as a BS in a network of a first RAT (e.g., NR) and may function as a BS for a second network of a second RAT (e.g., LTE). The UE A may be a UE in the first network of the first RAT. The UE B may be a UE in the second network of the second RAT. Steps of the method 700 can be executed by computing devices (e.g., a processor, processing circuit, and/or other suitable component) of the BS and the UEs. As illustrated, the method 700 includes a number of enumerated steps, but embodiments of the method 700 may include additional steps before, after, and in between the enumerated steps. In some embodiments, one or more of the enumerated steps may be omitted or performed in a different order.

In the method 700, the BS may serve the UE A using the first RAT over a first frequency band (e.g., the NR frequency band 210) allocated to the first RAT and a second frequency band (e.g., the LTE frequency band 220) allocated to the second RAT. The BS may configure the UE A to operate in a carrier aggregation mode with the first frequency band as a PCC and the second frequency band as an SCC. In addition, the BS may serve the UE B over the second frequency band using the second RAT.

At step 710, the BS communicates first data (e.g., UL data, DL data, UL control information, or DL control information, and/or the URLLC data 510a and 510b) with the UE A in the first frequency band using the first RAT (e.g., including communication protocols, signaling, and/or resource formats).

At step 720, the BS reconfigures a resource in the second frequency band allocated to the second RAT based on a configuration (e.g., a numerology and/or a link direction) of the first RAT. For example, the second RAT may configure the resource using a certain numerology and/or for communications in a certain link direction during a certain time period. Thus, in order for the BS to communicate with the UE A using the first RAT in the second frequency band during the time period, the BS may reformat the resource in the second frequency band to conform to the first RAT.

At step 730, the BS communicates second data (e.g., UL data, DL data, UL control information, or DL control information, and/or the URLLC data 510c) with the UE A in the second frequency band using the reconfigured resource and the first RAT. The BS may reconfigure the resource and communicate the second data in the second frequency band based on a transmission metric (e.g., latency constraints and/or retransmission statistics) of the first data and/or the second data.

At step 740, after communicating the second data with the UE A, the BS reconfigures the resource to revert back to a configuration (e.g., a numerology and/or a link direction) of the second RAT, for example, for communicating with the UE B of the second RAT.

At step 750, the BS communicates third data (e.g., UL data, DL data, UL control information, and/or DL control information) with the UE B of the second RAT in the second frequency band using the reverted resource and the second RAT.

As can be seen in the method 700, the BS may reconfigure a resource in the second frequency band to switch between a configuration of the first RAT and a second configuration of the second RAT from one time period to another time period depending on the BS scheduling decisions and/or needs to serve the UE A or the UE B. In other words, the BS may dynamically convert part of resources in the second frequency band allocated to the second RAT for use in the network of the first RAT and may revert the resources back to the second RAT afterwards for use in the network of the second RAT. Accordingly, the present disclosure can improve communication latency and/or reliability performance in the network of the first RAT by utilizing multi-RAT transmission diversity.

Figure 8:
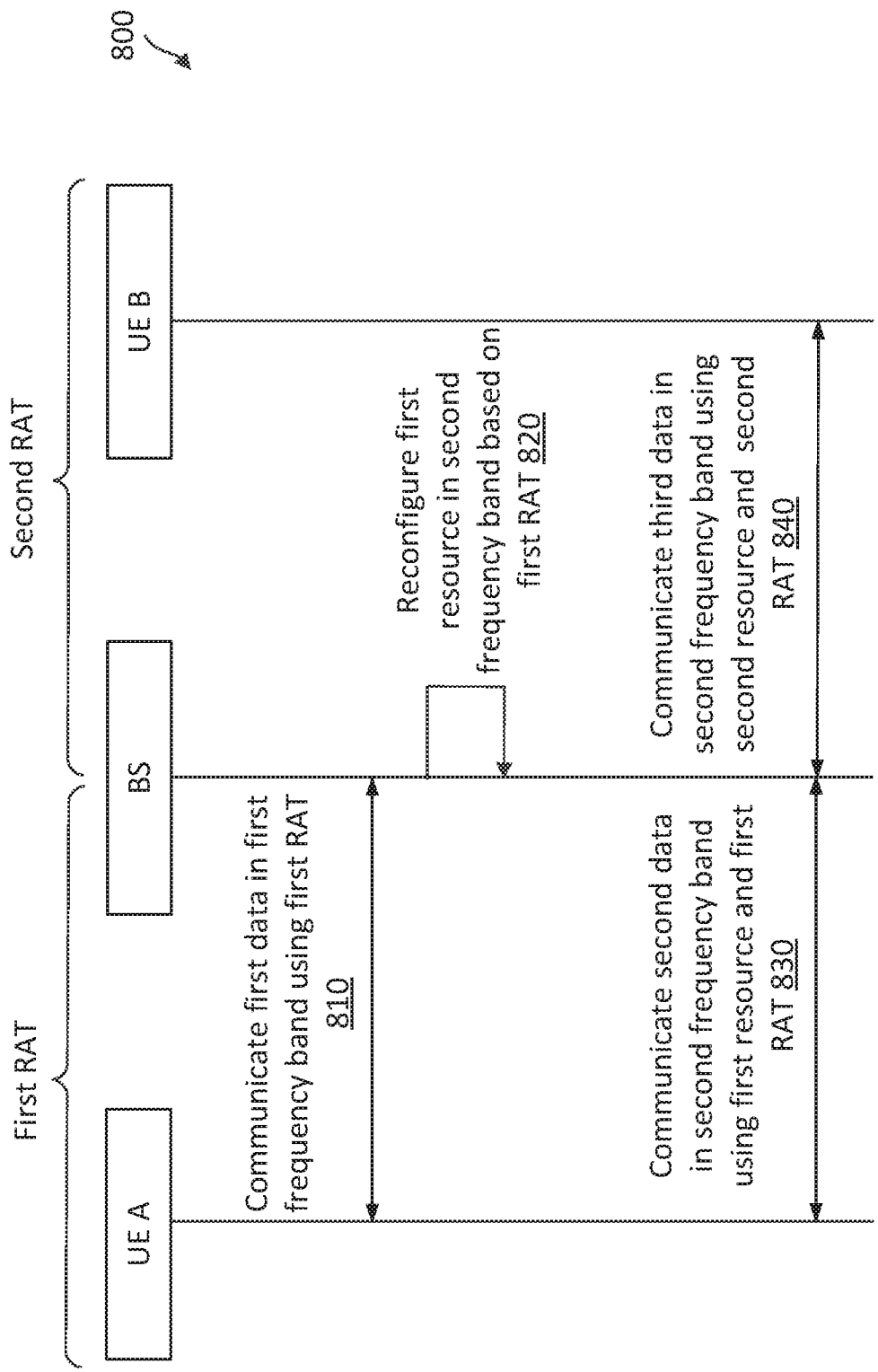
FIG. 8 is a signaling diagram illustrating a communication method with multi-RAT transmission diversity according to some embodiments of the present disclosure.

FIG. 8 is a signaling diagram illustrating a communication method 800 that utilizes multi-RAT transmission diversity according to some embodiments of the present disclosure. The method 700 is implemented by a BS (e.g., the BSs 105 and 400) and a UE A and a UE B (e.g., the UEs 115 and 300). The method 800 may use similar mechanisms as in the methods 500, 600, and 700 described above with respect to FIGS. 5, 6, and 7, respectively. The BS may function as a BS in a network of a first RAT (e.g., NR) and may function as a BS for a second network of a second RAT (e.g., LTE). The UE A may be a UE in the first network of the first RAT. The UE B may be a UE in the second network of the second RAT. Steps of the method 800 can be executed by computing devices (e.g., a processor, processing circuit, and/or other suitable component) of the BS and the UEs. As illustrated, the method 800 includes a number of enumerated steps, but embodiments of the method 800 may include additional steps before, after, and in between the enumerated steps. In some embodiments, one or more of the enumerated steps may be omitted or performed in a different order.

In the method 800, the BS may serve the UE A using the first RAT over a first frequency band (e.g., the NR frequency band 210) allocated to the first RAT and a second frequency band (e.g., the LTE frequency band 220) allocated to the second RAT. The BS may configure the UE A to operate in a carrier aggregation mode with the first frequency band as a PCC and the second frequency band as an SCC. In addition, the BS may serve the UE B over the second frequency band using the second RAT.

At step 810, the BS communicates first data (e.g., UL data, DL data, UL control information, or DL control information, and/or the URLLC data 510a and 510b) with the UE A in the first frequency band using the first RAT.

At step 820, the BS reconfigures a first resource in a second frequency band allocated to the second RAT based on a configuration (e.g., a numerology and/or a link direction) of the first RAT.

At step 830, the BS communicates second data (e.g., UL data, DL data, UL control information, or DL control information, and/or the URLLC data 510c) with the UE A in the second frequency band using the first reconfigured resource and the first RAT. The BS may reconfigure the first resource and communicate the second data in the second frequency band based on a transmission metric of the first data and/or the second data.

At step 840, the BS communicates third data (e.g., UL data, DL data, UL control information, and/or DL control information) with the UE B in the second frequency band using a second resource and the second RAT. The second resource is configured based on a configuration (e.g., a numerology and/or a link direction) of the second RAT. The BS may communicate the second data with the UE A of the first RAT and the third data with the UE B of the second RAT simultaneously. In an embodiment, the first resource and the second resource are different frequency resources (e.g., RBs) in the second frequency band. In an embodiment, the first resource and the second resource may correspond to the same frequency resource in the second frequency band. In such an embodiment, the BS may communicate the second data with the UE A using a first spatial layer and may communicate the third data with the UE B using a second spatial layer different from the first spatial layer. In other words, the BS communicates with the UE A and the UE B simultaneously on the second frequency band using spatial multiplexing.

Figure 9:
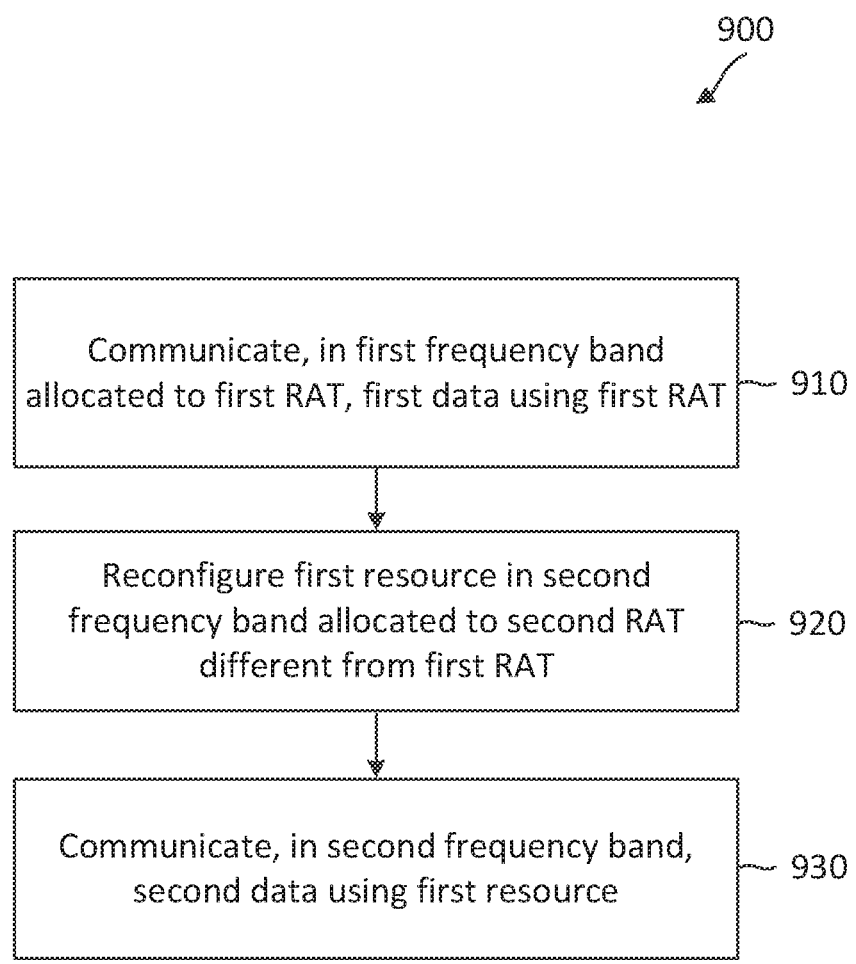
FIG. 9 is a flow diagram of a communication method with multi-RAT transmission diversity according to some embodiments of the present disclosure.

FIG. 9 is a flow diagram of a communication method 900 with multi-RAT transmission diversity according to some embodiments of the present disclosure. Steps of the method 900 can be executed by a computing device (e.g., a processor, processing circuit, and/or other suitable component) of a wireless communication device, such as the BSs 105 and 400. The method 900 may employ similar mechanisms as in the methods 500 and 600 described with respect to FIGS. 5 and 6, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes communicating, by a first wireless communication device with a second wireless communication device in a first frequency band (e.g., the NR frequency band 210) allocated to a first RAT (e.g., NR), first data (e.g., DL data, UL, data, DL control information, UL control information, and the URLLC data 510a and 510b) using the first RAT.

At step 920, the method 900 includes reconfiguring, by the first wireless communication device, a first resource in a second frequency band (e.g., the LTE frequency band 220) allocated to a second RAT (e.g., NR) different from the first RAT from implementing a configuration of the second RAT to implementing a configuration of the first RAT.

At step 930, the method 900 includes communicating, by the first wireless communication device with the second wireless communication device in the a second frequency band, second data (e.g., DL data, UL, data, DL control information, UL control information, and the URLLC data 510c) using the first resource implementing the configuration of the first RAT.

In an embodiment, the first wireless communication device corresponds to a BS and the second wireless communication device corresponds to a UE. In an embodiment, the first data and the second data are transmitted by the first wireless communication to the second wireless communication device. In another embodiment, the first data and the second data are received by the first wireless communication from the second wireless communication device.

In an embodiment, the first resource in the second frequency band is reconfigured based on a transmission metric of at least one of the first data or the second data. The transmission metric includes at least one of a number of retransmission opportunities for the first data or a latency constraint of the second data.

In an embodiment, the first wireless communication device communicates, with the second wireless communication device in the first frequency band, a grant (e.g., the transmission grant 506) indicating the first resource implementing the configuration of the first RAT for communicating the second data.

In an embodiment, the configuration of the first RAT includes a first numerology and the configuration of the second RAT includes a second numerology different from the first numerology. The first wireless communication device reconfigures the first resource by converting the first resource from the second numerology to the first numerology.

In an embodiment, the first wireless communication device communicates the second data with the second wireless communication device during a time period. The configuration of the first RAT includes a first link direction for the time period and the configuration of the second RAT includes a second link direction for the time period different from the first link direction. The first wireless communication device reconfigures the first resource by switching the first resource from the second link direction to the first link direction for the time period.

In an embodiment, the first wireless communication device reconfigures the first resource to revert to the configuration of the second RAT after communicating the second data. The first wireless communication device communicates third data with a third wireless communication device (e.g., of the second RAT) in the second frequency band using the first resource implementing the configuration of the second RAT.

In an embodiment, the first wireless communication device communicates third data with a third wireless communication device (e.g., of the second RAT concurrent with communicating the second data, third data using a second resource in the second frequency band implementing the configuration of the second RAT. In an embodiment, the first resource and the second resource are different frequency resources in the second frequency band. In another embodiment, the first resource and the second resource correspond to the same frequency resources in the second frequency band. The BS uses different spatial layers to communicate the second data with the second wireless communication device and the third data with the third wireless communication device.

In an embodiment, the second data includes the same encoded data information as the first data. In another embodiment, the second data includes different encoded data information than the first data. In an embodiment, the first data and/or the second data are URLLC data.

In an embodiment, a BS (e.g., the BSs 105 and 400) may utilize any suitable combinations of the methods 500, 600, 700, 800, and 900 described above with respect to FIGS. 5, 6, 7, 8, and 9, respectively, to provide multi-RAT transmission diversity when serving a URLLC service or any types of communication service to a UE (e.g., UEs 115 and 300).

Further embodiments of the present disclosure include an apparatus comprising means (e.g., the transceivers 310 and 410 and the antennas 316 and 416) for communicating, with a second wireless communication device in a first frequency band allocated to a first radio access technology (RAT), first data using the first RAT; means (e.g., the processors 302 and 402) for reconfiguring a first resource in a second frequency band allocated to a second RAT different from the first RAT from implementing a configuration of the second RAT to implementing a configuration of the first RAT; and means (e.g., the transceivers 310 and 410 and the antennas 316 and 416) for communicating, by the first wireless communication device with the second wireless communication device in the second frequency band, second data using the first resource implementing the configuration of the first RAT.

In some embodiments, the means for reconfiguring the first resources is further configured to reconfigure the resource based on a transmission metric of at least one of the first data or the second data. In some embodiments, the transmission metric includes at least one of a number of retransmission opportunities for the first data or a latency constraint of the second data. In some embodiments, the apparatus further comprises means (e.g., the transceivers 310 and 410 and the antennas 316 and 416) for communicating, with the second wireless communication device, a grant indicating the first resource implementing the configuration of the second RAT for communicating the second data. In some embodiments, the configuration of the first RAT includes a first numerology, the configuration of the second RAT includes a second numerology different from the first numerology, and the means for reconfiguring the first resource is further configured to convert the first resource from the second numerology to the first numerology. In some embodiments, the means for communicating the second data is further configured to communicate the second data during a time period, the configuration of the first RAT includes a first link direction for the time period, the configuration of the second RAT includes a second link direction for the time period different from the first link direction, and the means for reconfiguring the first resource is further configured to switch the first resource from the second link direction to the first link direction for the time period. In some embodiments, the apparatus further comprises means (e.g., the processors 302 and 402) for reconfiguring, after communicating the second data, the first resource to revert to the configuration of the second RAT; and means (e.g., the transceivers 310 and 410 and the antennas 316 and 416) for communicating, with a third wireless communication device of the second RAT in the second frequency band, third data using the first resource implementing the configuration of the second RAT. In some embodiments, the apparatus further comprises means (e.g., the transceivers 310 and 410 and the antennas 316 and 416) for communicating, with a third wireless communication device of the second RAT concurrent with communicating the second data, third data using the second resource in the second frequency band implementing the configuration of the second RAT.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    communicating, by a first wireless communication device with a second wireless communication device in a first frequency band allocated to a first radio access technology (RAT), first data using the first RAT;
    reconfiguring, by the first wireless communication device, a resource in a second frequency band allocated to a second RAT different from the first RAT from implementing a configuration of the second RAT to implementing a configuration of the first RAT, wherein the configuration of the first RAT includes a first numerology and the configuration of the second RAT includes a second numerology different from the first numerology, and wherein the reconfiguring includes converting the resource from the second numerology to the first numerology;
    communicating, by the first wireless communication device with the second wireless communication device, a grant indicating the resource implementing the configuration of the first RAT for communicating second data; and
    communicating, by the first wireless communication device with the second wireless communication device in the second frequency band, the second data using the resource implementing the configuration of the first RAT.

2. The method of claim 1, wherein the reconfiguring is based on a transmission metric of at least one of the first data or the second data.

3. The method of claim 2, wherein the transmission metric includes at least one of a number of retransmission opportunities for the first data or a latency constraint of the second data.

4. The method of claim 1, further comprising:
    communicating, by the first wireless communication device with a third wireless communication device concurrent with communicating the second data, third data using a second resource in the second frequency band implementing the configuration of the second RAT.

5. The method of claim 4, wherein the resource and the second resource are different frequency resources in the second frequency band.

6. The method of claim 4, wherein:
the resource and the second resource correspond to the same frequency resource in the second frequency band,
the communicating the second data includes communicating, by the first wireless communication device with the second wireless communication device, the second data in a first spatial layer, and
the communicating the third data includes communicating, by the first wireless communication device with the third wireless communication device, the third data in a second spatial layer different from the first spatial layer.

7. The method of claim 1, wherein the communicating the second data includes:
communicating, by the first wireless communication device with the second wireless communication device, the second data including the same encoded data information as the first data.

8. The method of claim 1, wherein the communicating the second data includes:
communicating, by the first wireless communication device with the second wireless communication device, the second data including different encoded data information than the first data.

9. The method of claim 1, wherein at least one of the first data or the second data is associated with ultra-reliable low-latency communication (URLLC) traffic.

10. The method of claim 1, wherein the second RAT is long-term evolution (LTE).

11. A method of wireless communication, comprising:
communicating, by a first wireless communication device with a second wireless communication device in a first frequency band allocated to a first radio access technology (RAT), first data using the first RAT;
reconfiguring, by the first wireless communication device, a resource in a second frequency band allocated to a second RAT different from the first RAT from implementing a configuration of the second RAT to implementing a configuration of the first RAT, wherein the configuration of the first RAT includes a first numerology and the configuration of the second RAT includes a second numerology;
communicating, by the first wireless communication device with the second wireless communication device, a grant indicating the resource implementing the configuration of the first RAT for communicating second data;
communicating, by the first wireless communication device with the second wireless communication device in the second frequency band, the second data using the resource implementing the configuration of the first RAT;
reconfiguring, by the first wireless communication device after communicating the second data, the resource to revert to the configuration of the second RAT; and
communicating, by the first wireless communication device with a third wireless communication device in the second frequency band, third data using the resource implementing the configuration of the second RAT.

12. The method of claim 11, wherein:
the communicating the second data includes communicating, by the first wireless communication device with the second wireless communication device, the second data during a time period,
the configuration of the first RAT includes a first link direction for the time period,
the configuration of the second RAT includes a second link direction for the time period different from the first link direction, and
the reconfiguring includes switching the resource from the second link direction to the first link direction for the time period.

13. The method of claim 11, wherein the reconfiguring is based on a transmission metric of at least one of the first data or the second data.

14. The method of claim 13, wherein the transmission metric includes at least one of a number of retransmission opportunities for the first data or a latency constraint of the second data.

15. An apparatus comprising:
a first antenna of a first radio access technology (RAT);
a transceiver configured to communicate, via the first antenna with a first wireless communication device in a first frequency band allocated to the first RAT, first data using the first RAT; and
a processor configured to reconfigure a resource in a second frequency band allocated to a second RAT different from the first RAT from implementing a configuration of the second RAT to implementing a configuration of the first RAT, wherein the configuration of the first RAT includes a first numerology, and the configuration of the second RAT includes a second numerology different from the first numerology, and the processor is further configured to reconfigure the resource by converting the resource from the second numerology to the first numerology, and
the transceiver is further configured to:
communicate, via the first antenna with the first wireless communication device, a grant indicating the resource implementing the configuration of the first RAT for communicating second data; and
communicate, via the first antenna with the first wireless communication device in the second frequency band, the second data using the resource implementing the configuration of the first RAT.

16. The apparatus of claim 15, wherein the resource is reconfigured based on a transmission metric of at least one of the first data or the second data.

17. The apparatus of claim 16, wherein the transmission metric includes at least one of a number of retransmission opportunities for the first data or a latency constraint of the second data.

18. The apparatus of claim 15, further comprising:
a second antenna of the second RAT,
wherein the transceiver is further configured to communicate, via the second antenna with a second wireless communication device concurrent with communicating the second data, third data using a second resource in the second frequency band implementing the configuration of the second RAT.

19. An apparatus comprising:
a first antenna of a first radio access technology (RAT);
a second antenna of a second RAT;
a transceiver configured to communicate, via the first antenna with a first wireless communication device in a first frequency band allocated to the first RAT, first data using the first RAT; and a processor configured to reconfigure a resource in a second frequency band allocated to the second RAT different from the first RAT from implementing a configuration of the second RAT to implementing a configuration of the first RAT, wherein the configuration of the first RAT includes a first numerology, and the configuration of the second RAT includes a second numerology, wherein the transceiver is further configured to:
  communicate, via the first antenna with the first wireless communication device, a grant indicating the resource implementing the configuration of the first RAT for communicating second data; and
  communicate, via the first antenna with the first wireless communication device in the second frequency band, the second data using the resource implementing the configuration of the first RAT, wherein the processor is further configured to reconfigure, after communicating the second data, the resource to revert to the configuration of the second RAT, and wherein the transceiver is further configured to communicate, via the second antenna with a second wireless communication device in the second frequency band, third data using the resource implementing the configuration of the second RAT.

20. The apparatus of claim 19, wherein:
the second data is communicated during a time period,
the configuration of the first RAT includes a first link direction for the time period,
the configuration of the second RAT includes a second link direction for the time period different from the first link direction, and
the processor is further configured to reconfigure the resource by switching the resource from the second link direction to the first link direction for the time period.

21. The apparatus of claim 19, wherein the resource is reconfigured based on a transmission metric of at least one of the first data or the second data.

22. The apparatus of claim 21, wherein the transmission metric includes at least one of a number of retransmission opportunities for the first data or a latency constraint of the second data.

23. A non-transitory computer-readable medium having program code recorded thereon, the program code comprising:
  code for causing a first wireless communication device to communicate, with a second wireless communication device in a first frequency band allocated to a first radio access technology (RAT), first data using the first RAT;
  code for causing the first wireless communication device to reconfigure a resource in a second frequency band allocated to a second RAT different from the first RAT from implementing a configuration of the second RAT to implementing a configuration of the first RAT, wherein the configuration of the first RAT includes a first numerology, and the configuration of the second RAT includes a second numerology different from the first numerology, and the code for causing the first wireless communication device to reconfigure the resource is further configured to convert the resource from the second numerology to the first numerology;
  code for causing the first wireless communication device to communicate, with the second wireless communication device, a grant indicating the resource implementing the configuration of the first RAT for communicating second data; and
  code for causing the first wireless communication device to communicate, with the second wireless communication device in the second frequency band, the second data using the resource implementing the configuration of the first RAT.

24. The non-transitory computer-readable medium of claim 23, wherein the code for causing the first wireless communication device to reconfigure the resource is further configured to reconfigure the resource based on a transmission metric of at least one of the first data or the second data.

25. The non-transitory computer-readable medium of claim 24, wherein the transmission metric includes at least one of a number of retransmission opportunities for the first data or a latency constraint of the second data.

26. The non-transitory computer-readable medium of claim 23, further comprising:
  code for causing the first wireless communication device to communicate, with a third wireless communication device concurrent with communicating the second data, third data using a second resource in the second frequency band implementing the configuration of the second RAT.

27. A non-transitory computer-readable medium having program code recorded thereon, the program code comprising:
  code for causing a first wireless communication device to communicate, with a second wireless communication device in a first frequency band allocated to a first radio access technology (RAT), first data using the first RAT;
  code for causing the first wireless communication device to reconfigure a resource in a second frequency band allocated to a second RAT different from the first RAT from implementing a configuration of the second RAT to implementing a configuration of the first RAT, wherein the configuration of the first RAT includes a first numerology, and the configuration of the second RAT includes a second numerology;
  code for causing the first wireless communication device to communicate, with the second wireless communication device, a grant indicating the resource implementing the configuration of the first RAT for communicating second data;
  code for causing the first wireless communication device to communicate, with the second wireless communication device in the second frequency band, the second data using the resource implementing the configuration of the first RAT;
  code for causing the first wireless communication device to reconfigure, after communicating the second data, the resource to revert to the configuration of the second RAT; and
  code for causing the first wireless communication device to communicate, with a third wireless communication device in the second frequency band, third data using the resource implementing the configuration of the second RAT.

28. The non-transitory computer-readable medium of claim 27, wherein:
  the code for causing the first wireless communication device to communicate the second data is further configured to communicate the second data during a time period,
  the configuration of the first RAT includes a first link direction for the time period,
  the configuration of the second RAT includes a second link direction for the time period different from the first link direction, and the code for causing the first wireless communication device to reconfigure the resource is further configured to switch the resource from the second link direction to the first link direction for the time period.

29. The non-transitory computer-readable medium of claim 27, wherein the code for causing the first wireless communication device to reconfigure the resource is further configured to reconfigure the resource based on a transmission metric of at least one of the first data or the second data.

30. The non-transitory computer-readable medium of claim 29, wherein the transmission metric includes at least one of a number of retransmission opportunities for the first data or a latency constraint of the second data.

* * * * *